Figures 1, 2, 3, 4:
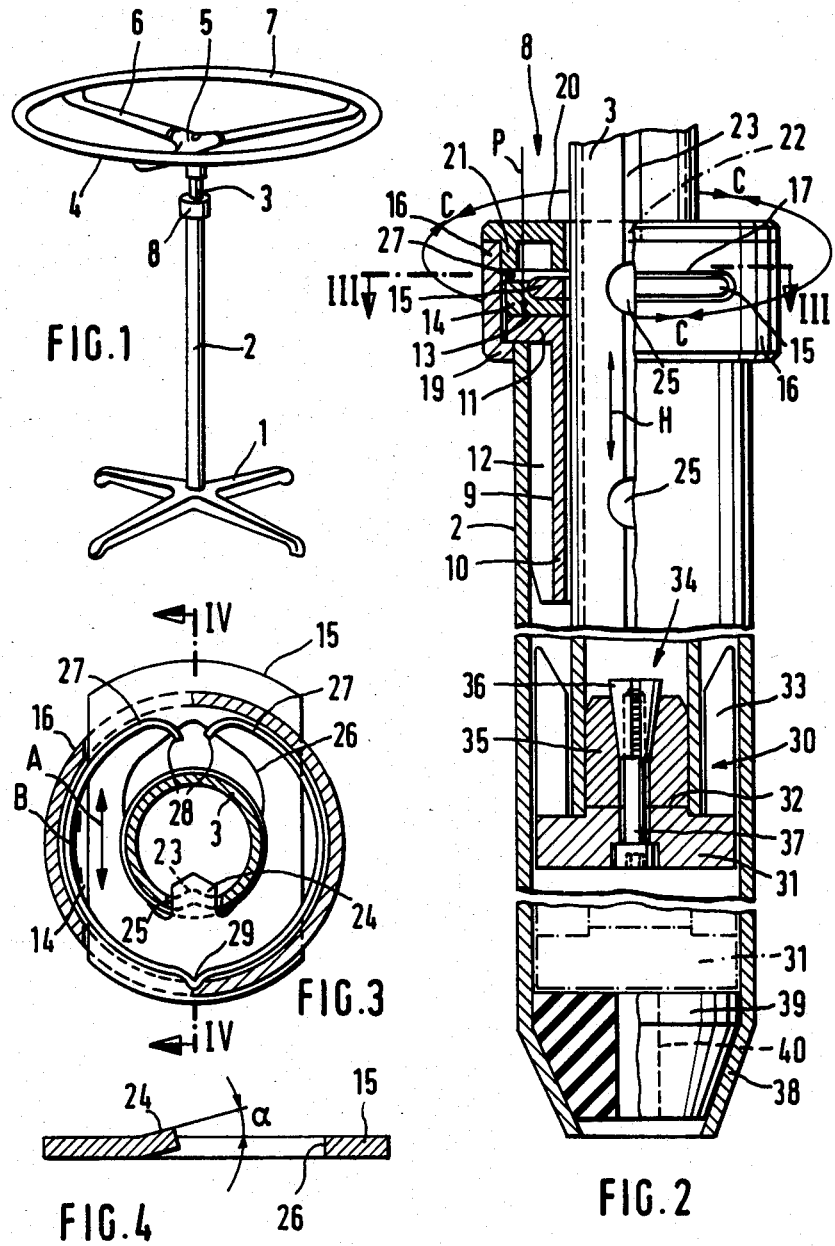

United States Patent [19]

Korth

[11] Patent Number: 4,645,081
[45] Date of Patent: Feb. 24, 1987

[54] ROTATABLE AND VERTICALLY ADJUSTABLE SINGLE-COLUMN PRESENTATION STAND

[75] Inventor: Bernd Korth, Weil am Rhein, Fed. Rep. of Germany

[73] Assignee: Protoned B.V., Amsterdam, Netherlands

[21] Appl. No.: 792,304

[22] Filed: Oct. 28, 1985

[30] Foreign Application Priority Data

Nov. 14, 1984 [CH] Switzerland .......................... 5450/84

[51] Int. Cl.⁴ ............................................... A47F 5/02
[52] U.S. Cl. ..................................... 211/196; 211/166; 211/208; 297/349; 248/408; 108/141
[58] Field of Search ............... 211/196, 166, 205, 207, 211/208, 163; 108/141; 297/349; 248/407, 408, 354.6, 416; 403/108, 328, 324

[56] References Cited

U.S. PATENT DOCUMENTS 2,293,144  8/1942  Jones ............................... 297/349 X
2,652,272  9/1953  Wood ............................... 248/407 X
3,862,735  1/1975  Cohen .............................. 211/166 X Primary Examiner—Ramon S. Britts
Assistant Examiner—Blair M. Johnson
Attorney, Agent, or Firm—Lahive & Cockfield

[57] ABSTRACT

The extension column (3) which is telescopically adjustable inside a vertical tube (2) and is optionally rotatable relative to the vertical tube (2) is supported on the latter by a radial and axial pivot bearing arrangement (11, 14) and a height-fixing device comprising a housing (16) and a coupling element (15) preferably in the form of a slide (15) which is supported on a bearing ring (14) which in turn sits on the bearing surface (13) of a support flange (11) supported by the vertical tube (2). The height-fixing slide (15) is mounted in a slide housing (16), which surrounds the bearing ring (14) and the support flange (11), and is against the restoring force of a return spring (27) transferable from a coupled position on the extension column (3) into a release position in which the extension column (3) is freely movable vertically.

8 Claims, 4 Drawing Figures

U.S. Patent   Feb. 24, 1987   4,645,081

ROTATABLE AND VERTICALLY ADJUSTABLE SINGLE-COLUMN PRESENTATION STAND

The invention relates to a rotatable and vertically adjustable single-column presentation stand according to the preamble of patent claim 1.

Presentation stands of this type are preferably used in sales shops for articles of all types, but especially for items of clothing and the like. Its advantage for the customer or the seller is that the customer or the seller, from a single position, can have the entire article collection pass by simple turning of the support arrangement and can make his or her choice from the articles offered. A further advantage is that such presentation stands can also be used in places where the customer or the seller cannot reach freely on all sides, for example in corner areas or along walls, where only a narrow passage is free. The vertical adjustability also enables the presentation stand to be in each case adjusted for articles of different length in such a way that they can be optimally presented.

In rotatable and vertically adjustable single-column presentation stands, both support bearing devices and height-locking devices are necessary which ensure a reliable and preferably low-clearance guidance of the extension column in the vertical tube, which extension column supports the supporting arrangement. Radial and axial bearing devices are frequently used as a support bearing which usually enable problem-free support and lateral guidance of the extension column. The disadvantage in this is that expensive components are necessary if both aesthetic and operational requirements are to be optimally fulfilled. Less satisfactory are the hitherto known height-fixing devices which are formed either as wedge catches detachable from the outside or as stud catches engaging laterally on the extension column. Whereas the wedge catches usually demonstrate a load-dependent blocking action and above all are not absolutely nonslip, stud catches are scarcely satisfactory from the aesthetic point of view; moreover, when actuated improperly, especially when they can be actuated under load, they can cause accidents.

The object of the invention is therefore to create a rotatable and vertically adjustable single-column presentation stand in which the abovementioned disadvantages are on the one hand removed by a simply constructed and easy to assemble radial and axial mounting of the extension column, and on the other hand by an antislip, blocking height-fixing device which is practically nonoperable in the loaded condition of the extension column.

This object is achieved according to the invention by the characterising features of patent claim 1. Embodiments thereof follow from the dependent claims.

Apart from efficient forming of the components, the proposed solution to the problem enables not only simple assembly of the individual parts at the erecting site of the frame and easy handling by persons who have had little practice, but also an aesthetically appealing formation of the externally visible parts of the rotary mounting and height-fixing device.

The invention is described below by way of example with reference to the drawing, wherein:

FIG. 1 shows an illustrative embodiment of a rotatable and vertically adjustable single-column presentation stand in perspective representational form, FIG. 2 shows on an enlarged scale and in partially sectional side view the radial and axial mounting of the extension column and the height-fixing device of the latter, FIG. 3 shows a section along line III—III in FIG. 2, and FIG. 4 shows a section along line IV—IV in FIG. 3.

In the Figures, the same reference numbers designate the same components.

As shown in FIG. 1, presentation stands according to the invention contain a supporting base 1, a vertical tube 2 inserted to fit tightly in the support base 1, an extension column 3 rotatably arranged in the vertical tube 2, and a supporting arrangement 4 erected on the extension column 3. The supporting arrangement 4, as shown, can be a supporting ring 7 supported by a central hub 5 via spokes 6. A bearing arrangement 8 is available between the vertical tube 2 and the extension column 3 held rotatably and vertically adjustable therein, which bearing arrangement 8 is described in principle below with reference to FIGS. 2, 3 and 4.

The bearing arrangement 8 comprises an upper guide member 9 which is keyed in the vertical tube 2 and has a radially internal guide sleeve 10 for the central retention of the extension column 3 and has an upper lying annular support flange 11, the underside of which sits on the upper end of the vertical tube 2. The upper guide member 9 is keyed inside the vertical tube 2 by means of ribs 12 directed radially outwards on the guide sleeve 10. The upper side of the support flange 11 is formed as an annular seating 13 for a bearing ring 14 which rotatably supports the extension column 3 on the vertical tube 2 via a coupling element which is preferably a height-indexing slide 15 described below. Moreover, the height-indexing slide 15, designated in simplified manner below as slide 15, sits in a slide housing 16 which is provided with lateral passage openings 17 for the slide 15. The slide housing 16 has an approximately tubular form and is provided with an underlying base flange 19 which is oriented inwards and engages in the manner of an annular shoulder beneath the support flange 11 on the upper guide member 9. The bearing arrangement 8 is closed at the top by a cover ring 20 which is retained in rotationally fixed manner at the slide housing via an annular rib 21. It also carries a driving lug 22 which engages into a drive slot 23 on the outside of the extension column 3 and thus forms a rotary coupling member between the slide housing 16 and the extension column 3.

The relationship between FIGS. 2 and 3 is explained in that, on the one hand, the slide 15 which is displaceable in the slide housing 16 in the direction of the arrow A is provided with an engagement tongue 24, and the extension column 3 is provided with catch penetrations 25 along an axially oriented dividing line on the column surface. The above mentioned drive slot 23 in the extension column 3 is also aligned to the said dividing line, into which drive slot 23 engages the driving lug 22 on the cover ring 20.

FIG. 3 shows a sectional view along line III—III in FIG. 2 of the slide 15 in the position where its engagement tongue 24 grips through a catch penetration 25 of the extension column 3 and thus determines one of the possible elevated positions of the extension column 3. The slide 15 of which FIG. 4 shows a section along line IV—IV in FIG. 3, contains an elongated centre penetration 26, into which the engagement tongue 24 is formed or penetrates, and through which extends the extension column 3. A centre part of the penetration 26, which centre part is terminated by parallel walls, is at least of such a length that a slide movement is possible between the shown engagement position of the tongue 24 in a catch penetration 25 and a disengagement position, in which the tongue 24 lies outside the periphery of the column 3 or of a catch penetration 25. In the latter case, the extension column 3 can be moved freely in telescoping manner in the vertical tube 2 relative to the latter; it can now be brought to the required elevated position. The part of the bearing ring 14 (arrow B) which can rotate along with the extension column 3, which part can be seen in section III—III, is designated as 14.

So that the slide 15 remains securely in a catch penetration 25 of the extension column 3 in the nonoperated condition, two measures are taken: firstly the tongue 24 is bent upwards at an angle α of about 5° to 15°, by which means an automatic lock results under the weight of the extension column load, and secondly a rounded return spring 27 having a pair of bent leg ends 28 is accommodated in the slide housing 16. The leg ends 28 engage on V-shaped surface sections, located symmetrically to one another, of the penetration 26 in such a way that the slide 15 is pretensioned in the direction of the engagement position. So that the return spring 27 cannot turn in the housing 16, thus enabling the leg ends 28 to tilt, it is provided with a lock catch 29 which is engaged into the inner wall of the slide housing 16.

Thus a secured and free all round mobility of the supporting arrangement 4 (FIG. 1) in the direction of the arrows C and C is obtained even when there is a bearing load in the direction of arrow P and the slide 15 is engaged; and, moreover, an extension column movement in the direction of arrow H is obtained when the slide 15 is disengaged and when the load is removed from the bearing arrangement 8.

Back to FIG. 2: the upper central retention of the extension column 3 is provided by the upper guide member 9 pertaining to the bearing arrangement 8 and by the guide sleeve 10 keyed into the upper end of the vertical tube 2. A lower guide member 30 is attached to the lower end of the extension column 3 to ensure the axial alignment of the vertical tube 2 and the extension column 3 and thus an attractive appearance of the presentation stand. This guide member 30 essentially consists of a base plate 31, having an elevation 32 located on the top of the latter and engaging in centering manner on the lower end of the extension column 3, centering vanes 33 which project radially upwards on the base plate and preferably are in slightly elastic contact on the vertical tube inner wall, and a conical clamping device which is designated as a whole as 34 and firmly holds the lower guide member 30 at the lower end of the extension column 3. The conical clamping device, consisting of a clamping block 35, a conical expanding member 36 and a clamping screw 37, makes it possible for the extension column 3 to be inserted into the vertical tube 2 only after complete assembly of the bearing arrangement. Moreover, the lower guide member 30 also acts as an upper extension limiter for the extension column 3.

To limit the vertical movement of the extension column 3 downwards, the lowermost section of FIG. 2 shows a simple arrangement which can be inexpensively manufactured. At the lower end of the vertical tube 2, a section 38 is conically narrowed in such a way that a buffer body 39 of an elastic material can be captively held. The buffer body 39 is expediently provided with a longitudinal bore 40, through which can be inserted a hexagon socket screw key or a screwdriver for actuating the clamping screw 37.

I claim:

1. Rotatable and vertically adjustable single-column presentation stand having a vertical tube (2) held on a supporting base (1), an extension column (3) which is rotatable in the vertical tube (2), is supported on a radial and axial pivot bearing device (11, 14) and a height-fixing device and has an article-supporting arrangement (4) at its upper end, and having a guide device (9, 30) centering the extension column (3) in the vertical tube (2), characterised in that the pivot bearing device and the height-fixing device consist of a support flange (11) fixed to the upper end of the vertical tube (2) and having an annular bearing surface (13), a bearing ring (14) supporting the extension column (3) on the support flange (11) via a detachable coupling element (15), and a housing (16) gripping around the coupling element (15), the support flange (11), the bearing ring (14) and the upper end of the vertical tube (2), with the housing (16) being engageable in rotational relationship via the coupling element (15), and an annular flange (19) connected to the housing (16) being in engagement with the support flange (11) in such a way that there is a positive connection between the vertical tube (2) and the extension column (3) when the coupling element (15) is engaged.

2. Single-column presentation stand according to claim 1, characterised in that the detachable coupling element is a height-indexing slide (15) which is mounted in passage openings (17), diametrically present in the enclosing wall of the housing, and has a central penetration (25) for the extension column (3) to pass through.

3. Single-column presentation stand according to claim 2, characterised in that the height-indexing slide (15) has an engagement tongue (24) which projects into a selected catch penetration (26) and can be brought into engagement into said selected catch penetration (26) on the extension column (3).

4. Single-column presentation stand according to claim 1, characterised in that the guide device consists of an upper guide member (9) and a lower guide member (30), that the upper guide member (9) is connected in one piece to the support flange (11) of the pivot bearing device, and that the lower guide member (30) is connected to the extension column (3) by means of a conical clamping connection (34) which engages in the lower end of the extension column (3).

5. Single-column presentation stand according to claim 4, characterised in that the upper guide member (9) is a guide sleeve (10) centered in the vertical tube (2) by means of radially outwardly oriented ribs (12), and that the ribs (12) are connected in one piece to the guide sleeve.

6. Single-column presentation stand according to claim 4, characterised in that the lower guide member (30) is a base plate (31) which supports the lower end of the extension column (3) and on which are formed radially oriented, axially running centering vanes (33) which sit against the inner wall of the vertical tube (2) under light spring contact pressure.

7. Single-column presentation stand according to claim 3, characterised in that the height-indexing slide (15) is pretensioned in the engagement direction by a return spring (27) mounted in the housing (16).

8. Single-column presentation stand according to claim 3, characterised in that the engagement tongue (24) is bent out of the slide plane in the upwards direction.

* * * * *